# 3,753,939
STABILIZATION OF ACRYLAMIDE POLYMERS WITH THIOSULFATES

Hans S. Von Euler-Chelpin, Sundsvall, Sweden, assignor to Kemanord AB, Stockholm, Sweden
No Drawing. Filed Feb. 16, 1971, Ser. No. 115,893
Int. Cl. C08f 29/00
U.S. Cl. 260—29.6 Z
9 Claims

ABSTRACT OF THE DISCLOSURE

Compositions comprising water-soluble acrylamide polymer and water-soluble thiosulfate are provided. The thiosulfate improves the stability of the polymers against thermal and oxidative degradation.

BACKGROUND OF THE INVENTION

The present invention relates to water-soluble acrylamide polymers and copolymers. In particular, it relates to aqueous solutions or compositions of such polymers having improved stability against thermal or oxidative breakdown or degradation.

High molecular weight acrylamide polymers when in aqueous solutions can be adsorbed onto a great many inorganic compounds having low water solubility. Therefore, these polymers are often employed as flocculants in various applications wherein suspensions of such inorganic compounds are used. These compounds are used in a wide variety of industries, such as in the paper industry, for water purification techniques, mining and so on.

For most of these applications it is essential that the polymer possesses a high average molecular weight within the range of 100,000 to 20,000,000. The polymers are generally added to the suspensions in the form of very dilute aqueous solutions, such as 0.1% by weight or less of the polymer.

Acrylamide polymers when in aqueous solutions, however, undergo molecular weight breakdown or degradation. Therefore, they can only be stored in aqueous solutions for a very limited period of time or their usefulness as flocculants will be reduced. Diluted polymer solutions are more susceptible to degradation than solutions of higher concentration of the polymer. The degradation is particularly rapid when the solution is kept at an elevated temperature. In a medium of low oxygen content the degradation is slower.

The exact mechanism of the thermal and/or oxidative degradation of acrylamide polymers is not known. Probably the degradation is initiated by the formation of redox systems, wherein atmospheric oxygen and/or heavy metal ions such as iron and copper and the like are active. During the degradation, the average molecular weight of the polymers is reduced and accordingly the viscosity of the solution is decreased. For instance, the viscosity of a 3% solution of an acrylamide polymer is reduced by half after two weeks storage at room temperature in the presence of air. According to the present invention, stable aqueous solutions of acrylamide polymers can be obtained which are capable of being stored at the same conditions for 6–8 months without a significant reduction in viscosity.

Various chemicals have heretofore been added to acrylamide polymers in order to prevent their degradation. For instance, U.S. Pat. 3,234,163 discloses the use of water-soluble thiocyanates as stabilizing agents. In U.S. Pat. 3,235,523 thiourea is disclosed as a stabilizing additive. Furthermore, German Auslegeschrift 1,181,905 sets forth that water soluble nitrites can be used for stabilizing acrylamide polymers. In addition, various sulfites have been proposed as stabilizing agents under certain conditions such as in the absence of air or oxygen.

These known additives, however, have not been entirely satisfactory in stabilizing solutions of acrylamide polymers. For example, in certain instances these additives adversely affect other properties of the acrylamide polymers. Continuing work is therefore being done in order to discover a more effective stabilizing agent.

According to the present invention, it has been found that thiosulfate ions possess improved stabilization properties as compared to the stabilizing materials heretofore added to acrylamide polymers.

BRIEF DESCRIPTION OF INVENTION

The present invention is concerned with compositions which comprise water-soluble acrylamide polymer and at least about 0.1% by weight based on the weight of the polymer of a water-soluble thiosulfate. The presence of the thiosulfate provides compositions which have improved stability against thermal and oxidative degradation.

DESCRIPTION OF PREFERRED EMBODIMENTS

The compositions of the present invention exhibiting improved stability contain water-soluble acrylamide polymer and water-soluble thiosulfate. The compositions of the present invention are preferably aqueous solutions.

The preferred acrylamide polymers of the present invention are those water-soluble polymers containing about 50–100% carbamoylethylene mers or acrylamide units. The other mers (units) of the polymer may be of various types with the most important mers being those which contain functional groups such as carboxyl-, sulfonic acid-, sulfonium-, amino-, and quaternary ammonium groups. Hydrophobic mers may also be present in the polymer. Of course, the amount of the hydrophobic monomers must be limited so that they do not render the polymer insoluble in water. The polymers may be prepared by homopolymerization of acrylamide or by copolymerization of acrylamide with suitable copolymerizable monomers. They may also be prepared by chemical modification of such preformed polymers as homopolymers and copolymers of acrylonitrile and/or acrylamide and/or acrylic acid and/or their alkylesters.

The concentration of the polymer in an aqueous solution usually is within the range of about 0.005–15% by weight, and preferably is about 0.2–5% by weight. At higher concentrations, the viscosity of the solution becomes so high that the solution is troublesome to handle. However, even in such cases of extremely high viscosities, the thiosulfate ions are still effective as stabilizing agents. Accordingly, the maximum concentration of the acrylamide polymer in the aqueous solution is not crucial and can be higher than 15% by weight. At such higher concentrations the amount of thiosulfate may be lower than in the more dilute aqueous solutions of the polymer.

The thiosulfate additives of the present invention are the water-soluble thiosulfates. The particular anion of the thiosulfate does not affect the acrylamide polymer at the concentrations used. Some examples of suitable thiosulfates include sodium thiosulfate, potassium thiosulfate, ammonium thiosulfate, calcium thiosulfate, and magnesium thiosulfate. The preferred thiosulfate is sodium thiosulfate.

The amount of the water-soluble thiosulfate employed should be at least about 0.1% by weight and preferably about 0.1–10% by weight based on the dry weight of the acrylamide polymer. The best results with regard to effectiveness per unit cost are obtained with amounts of thiosulfate of about 0.5–5% by weight based on the weight of the polymer. Of course, amounts in excess of 10% by weight of the thiosulfate can be used, although such large amounts have not demonstrated any increased stabilizing effect over 10% by weight.

The compositions of the present invention containing the stabilizing agent and acrylamide polymer can be prepared in any suitable manner. For example, an aqueous solution of the thiosulfate can be added to an aqueous solution of the polymer. Another method of obtaining the composition of the present invention is to intimately admix dry polymer with crystalline thiosulfate and then dissolve the composition in water. When the polymer has been prepared in an aqueous solution, and it is desired to obtain a dry polymer by evaporation of the water, it is advantageous to add the thiosulfate to the aqueous solution before the drying. By adding before the drying, protection against degradation is obtained during the drying as well as when the dried polymer composition is redissolved. Stabilization during drying is particularly required when the drying is carried out in the presence of sulfite which is present to inactivate monomer residues.

The invention will be further illustrated by means of the following examples, which however, do not intend to limit the scope of the invention.

Example 1

A 2% solution of a polyacrylamide wherein 30% of the nitrogen atoms are substituted with sulfonic acid groups was prepared. The pH of the solution 2.1. To samples of 300 grams of this solution are added 30 ml. of 1% water-solutions of the chemicals listed in Table I below (i.e., 5 grams of additives per 100 grams of polymer). Thiosulfate was tested also at a lower dosage. After mixing the viscosity of the solution was measured at 23° C. in a Brookfield viscosimeter type RVT at 10 r./m. using spindle No. 2. The solutions were kept in plastic jars with loosely fitting covers during 12 days (day and night) at 23° C., and then the viscosity was measured. The results are presented in the following Table I:

TABLE I

| Addition | Dosage, percent by weight | Original viscosity (cps.) | Final viscosity (cps.) | Viscosity decrease in percent |
|---|---|---|---|---|
| None | | 776 | 170 | 78 |
| Ammonium thiocyanate | 5 | 716 | 312 | 56 |
| Ammonium thiosulfate | 5 | 684 | 600 | 12 |
| Do | 0.5 | 684 | 336 | 51 |

Example 2

A 3% solution of a polyacrylamide homopolymer was prepared. To three samples of 300 grams of this solution were added the stabilizers in Table II. The viscosity of each solution was measured using the same instrument as used in Example 1 at 23° C. and 5 r./m. The polymer solutions were kept in plastic jars with loosely fitting covers for 5 days at 48° C. The temperature was then reduced to 23° C. and the viscosity was measured again. The results are presented in the following Table II:

TABLE II

| Addition | Original viscosity (cps.) | Final viscosity (cps.) | Viscosity decrease in percent |
|---|---|---|---|
| | 3,250 | 90 | 97 |
| 0.1 gram of thiocarbamide | 3,410 | 1,790 | 47.5 |
| 0.5 gram of Na₂S₂O₃·5H₂O | 2,770 | 1,850 | 33 |

The price for sodium thiosulfate is considerably lower than that for thiocarbamide. Accordingly, the cost for the thiosulfate addition is lower than that for thiocarbamide addition. Despite this lower cost, the stabilization effect of the thiosulfate is still better than the thiocarbamide.

Example 3

A 3% solution having pH 3.4 was prepared from a copolymer containing 95 parts by weight of acrylamide and 5 parts of acrylic acid. Samples of 300 grams of this solution were mixed with 30 grams of a water solution containing different amounts of sodium sulfite and sodium thiosulfate. After mixing, the viscosity of the solutions was measured using a Brookfield viscosimeter RVT at 23° C. and at 10 r./m. with spindle No. 4. After storing at different times at 23° C. in plastic jars with loosely fitting covers, the viscosity was measured again and the percent decrease was calculated as in the Examples 1 and 2. The results are presented in the following Table III.

TABLE III

| Addition of chemicals | | Viscosity decrease in percent after storing for— | | | |
|---|---|---|---|---|---|
| Type | Quantity (mval.) | Quantity (g. 100 g. polymer) | 14 days | 45 days | 116 days | 251 days |
| Na₂S₂O₃·5H₂O | 0.5 | 0.69 | 64 | | | |
| | 1.2 | 1.65 | 31 | 21 | 24 | |
| | 2.0 | 2.75 | 18 | 14 | 19 | 15 |
| | 4.0 | 5.5 | 16 | 11 | 14 | 4 |
| Na₂SO₃ | 0.5 | | 88 | | | |
| | 1.2 | | 94 | | | |
| None | | | 72.5 | 98.5 | | |

Example 4

A solution designated as viscous solution A was prepared containing 3% by weight of a copolymer of 88 parts by weight of acrylamide and 12 parts by weight of ammonium acrylate and 0.15% by weight of carbamide.

A solution designated as solution B was obtained containing 0.05% of the copolymer and 1% by weight of sodium chloride by adding sodium chloride and diluting viscous solution A.

100 grams of solution A were mixed with 0.15 grams of sodium bisulfite until the salt was dissolved. A small sample of this mixture was poured out onto a flat piece and evaporated in a heat oven at 106° C. for 50 minutes. A solution designated as solution C containing 0.05% by weight of the copolymer and 1% by weight of NaCl was prepared from the dried polymer. The relative viscosity was determined in the same way as for solution B above.

100 grams of solution A were mixed with 0.15 gram of sodium bisulfite and 0.15 gram of sodium thiosulfate until the salts were dissolved. A small amount of this mixture was poured out on a flat piece and evaporated in a heat oven at 106° C. for 50 minutes. A solution designated as solution D containing 0.05% by weight of the copolymer and 1% by weight NaCl was prepared from the dried polymer. The relative viscosity of solution D was determined in the same way as for solution B above.

The relative viscosity for solution B was 1.54, for solution C 1.29 and for solution D 1.51. The thiosulfate addition thus demonstrated good stabilizing properties for the polymer against degradation when drying in the presence of sulfite.

More or less detailed claims will be presented hereinafter and even though such claims are rather specific in nature, those skilled in the art to which this invention pertains will recognize that there are obvious equivalents for the specific materials recited therein. Some of these obvious equivalents are disclosed herein, other obvious equivalents will immediately occur to one skilled in the art and still other obvious equivalents could be readily ascertained upon rather simple, routine, non-inventive experimentation. Certainly no invention would be involved in substituting one or more of such obvious equivalents for the materials specifically recited in the claims. I intend that all such obvious equivalents be encompassed within the scope of this invention and patent grant in accordance with the well-known doctrine of equivalents, as well as changed proportions of the ingredients which do not render the composition unsuitable for the disclosed purposes.

What is claimed is:

1. A composition consisting essentially of an aqueous solution of an acrylamide polymer containing at least 50 mol percent of carbamoyl ethylene units and at least 0.1% by weight of a water soluble thiosulfate based on the weight of said acrylamide polymer.

2. The water solution of claim 1 which contains about 0.1 to about 10% by weight of a soluble ethiosulfate based on the weight of said polymer.

3. The composition of claim 1 wherein said thiosulfate is sodium thiosulfate.

4. The composition of claim 1 wherein said acrylamide polymer is polyacrylamide.

5. The composition of claim 1 which contains about 0.1 to about 10% by weight of said thiosulfate based on the weight of said polymer.

6. A method for improving the stability of an aqueous solution of water soluble acrylamide polymer containing at least about 50 mol percent carbamoyl ethylene units to reduce thermally induced molecular weight breakdown, which comprises incorporating into said aqueous solution of said polymer at least about 0.1% by weight of a water soluble thiosulfate based on the weight of said acrylamide polymer.

7. The method of claim 6 which further includes evaporating the water from said solution, and recovering a solid admixture of said polymer and said thiosulfate.

8. A method according to claim 6 wherein about 0.1 to about 10% by weight of said thiosulfate is incorporated into said aqueous solution.

9. A method according to claim 8 wherein said thiosulfate is sodium thiosulfate.

References Cited

UNITED STATES PATENTS

| | | | |
|---|---|---|---|
| 2,960,486 | 11/1960 | Pye | 260—45.7 |
| 3,053,778 | 9/1962 | Toone | 260—2.5 |
| 3,234,163 | 2/1966 | Schurz et al. | 260—29.6 |
| 3,235,523 | 2/1966 | Schurz et al. | 260—29.6 |
| 3,620,991 | 11/1971 | Wasser | 260—29.6 |

FOREIGN PATENTS

| | | |
|---|---|---|
| 832,949 | 4/1960 | Great Britain. |
| 1,181,905 | 11/1964 | Germany. |
| 670574 | 2/1968 | South Africa. |

MELVIN GOLDSTEIN, Primary Examiner

U.S. Cl. X.R.

260—45.75